United States Patent [19]

Simjian

[11] 3,890,599

[45] June 17, 1975

[54] ARRANGEMENT FOR PROTECTING AND AUTHENTICATING A DOCUMENT

[75] Inventor: Luther G. Simjian, Greenwich, Conn.

[73] Assignee: Command Automation, Inc., Greenwich, Conn.

[22] Filed: Sept. 13, 1973

[21] Appl. No.: 396,687

[52] U.S. Cl............ 340/149 R; 340/149 A; 340/153
[51] Int. Cl. .............................................. G07f 7/02
[58] Field of Search............ 340/153, 149 A, 149 R; 235/61.7 B, 61.8 A; 186/1 R; 179/2 CA

[56] References Cited
UNITED STATES PATENTS 3,356,021  12/1967  May et al..................... 235/61.8 A
3,622,995  11/1971  Dicks............................ 340/149 A Primary Examiner—Harold I. Pitts

[57] ABSTRACT

The present invention discloses an arrangement in which a redeemable document at the time of issuance is encoded with code indicia which are stored in central storage means while the document remains unredeemed. When presented for redemption, the code indicia are sensed and verified for being stored in the storage means. If the presence of the code indicia is confirmed in the storage means, the document is authenticated and the code indicia are erased in the storage means. If the indicia cannot be confirmed, the document is rejected. The invention is useful in such instances where documents are subject to duplication, pilferage, etc., for instance, airline travel tickets.

10 Claims, 4 Drawing Figures

ARRANGEMENT FOR PROTECTING AND AUTHENTICATING A DOCUMENT

CROSS-REFERENCE TO PENDING APPLICATION

This application is related to my pending U.S. Pat. Application Ser. No. 350,902 filed Apr. 13, 1973 entitled "Merchandising Arrangement" now U.S. Pat. No. 3,824,544 dated July 16, 1974.

BACKGROUND OF THE INVENTION

This invention relates to an arrangement for protecting and safeguarding documents, such as airline tickets and similar documents which are issued to the public and which when issued represent a substantial monetary value. The present arrangement involves a unique combination of elements for protecting the issued documents from forgery and subsequently for authenticating the documents at the time of redemption for value or presentation for service.

It is well known that the pilferage and forgery of tickets, such as airline tickets, has assumed an alarming status and that countermeasures have been instituted to lessen theft and forgery of these documents. However, despite the considerable amount of effort, the heretofore existing problem still prevails.

SUMMARY OF THE INVENTION

In accordance with the broad principle of the present invention, a ticket upon purchase becomes encoded with code indicia which are stored in a central code bank means. This constitutes the protecting phase of the process. When the ticket is presented for service, such as at the gate of the airline terminal, the ticket is inserted in a document validation means which senses the code indicia previously affixed to the ticket, transmits a signal corresponding to the code indicia to the central code bank means to determine whether the respective code indicia are still stored in the code bank means. If the respective indicia are present in the code bank means, a validation signal is transmitted to the document validation means to signify that the ticket is valid for use. Simultaneously, the stored code indicia are erased from the storage means of the code bank means in order to preclude the use of a forged or duplicated ticket carrying the same code indicia.

One of the principal objects of this invention, therefore, is the provision of a new arrangement for protecting and subsequently validating documents.

Another important object of this invention is the provision of a new arrangement for minimizing, if not precluding, the duplication and forgery of documents, such as airline travel tickets.

A further and other object of this invention is the provision of an arrangement for first protecting a document by applying to the document code indicia and subsequently, at a later point in time, authenticating the validity of the previously affixed code indicia.

Still other objects of this invention will be more clearly apparent by reference to the following description when taken in conjunction with the accompanying drawings.

DETAILED DESCRIPTION OF THE INVENTION

As used in the specification and claims the word "erase" shall not be construed in its limited sense of denoting solely a physical removal, but shall encompass also the meanings of rendering inaccessible, cancelled, annulled, invalidated and the like, indicating that code indicia are or have been rendered invalid.

Figure 1:
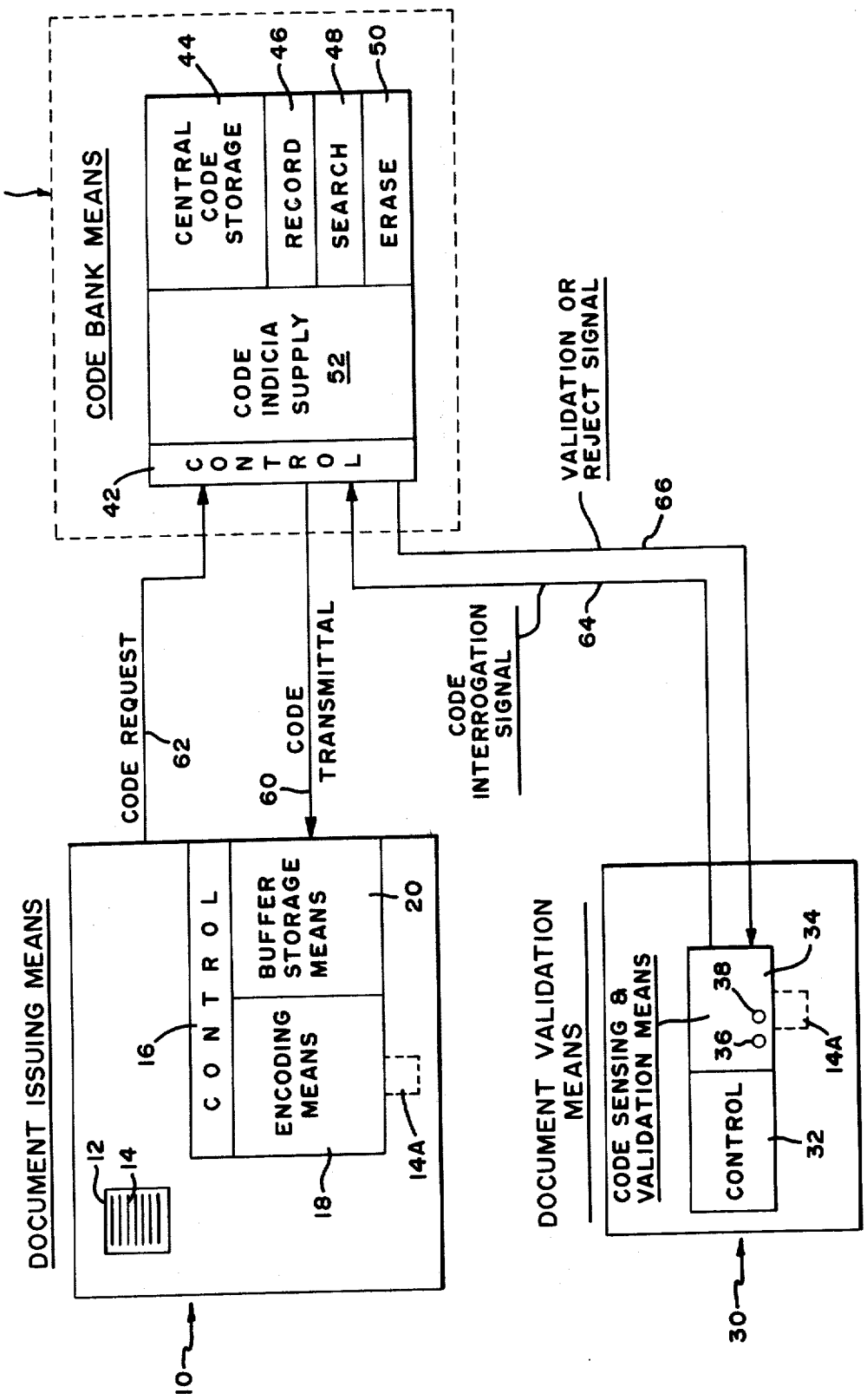
FIG. 1 is a schematic block diagram showing the several components forming one of the embodiments of the present invention.
Figure 2:
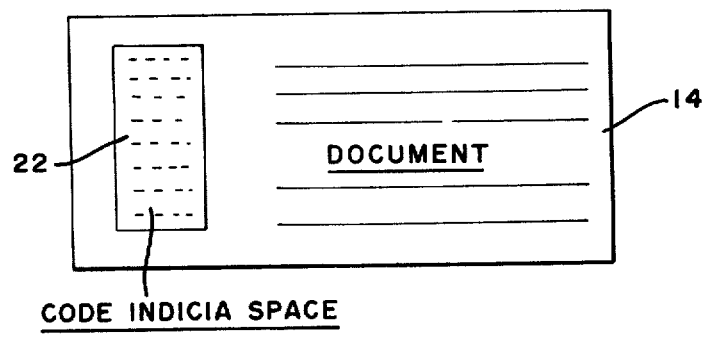
FIG. 2 is a schematic plan view of a typical document.
Figure 3:
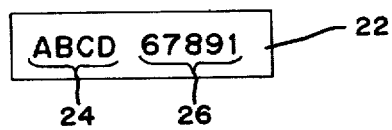
FIG. 3 is an illustration of a typical code indicia which may be used.

Referring now to the figures and FIGS. 1, 2 and 3 in particular, numeral 10 in FIG. 1 identifies a document issuing means comprising, for instance, a self-contained apparatus available at a ticket issuing place, such as at a travel agency. The document issuing means 10 contains a pocket 12 for storing a supply of documents, such as airline travel tickets 14. In addition, the document issuing means includes a control means 16, an encoding means 18 and a buffer storage means 20.

A typical document 14 is shown in FIG. 2 which will carry all the necessary information, and in addition includes a space block 22 for encoding the document with code indicia which are peculiar to this particular document and which will not be duplicated, at least for some time, on a similar and subsequent document.

FIG. 3 indicates a typical code which may contain two portions, for instance, an originating code portion 24 and a set of serializing code indicia 26. It will be apparent that additional identifying code symbols may be used such as are well known in the art. Moreover, the code indicia may comprise visible characters or comprise magnetic code indicia, punched apertures, bar code lines or similar codes or symbols as are well known and established in the art.

Numeral 30 identifies the document validation means which preferably is located at the place where the document is presented for acceptance, such as the airline terminal gate or at places where the document can be redeemed for its cash value. The document validation means includes a control means 32 which is coupled to a code sensing and validation means 34. The code sensing and validation means may include, furthermore, a pair of light indicating means 36 and 38, the selective energization of which denotes either a 'code valid' signal or a 'code reject' signal.

In addition, the arrangement per FIG. 1 includes a code bank means 40 which serves both the document issuing means 10 and the document validation means 30. The code bank means 40, similar to a modern digital computer, comprises a control section 42, a central code storage means 44, such as a magnetic tape or disk storage device, means 46 for recording indicia on the storage means 44, means 48 for searching the storage device 44 for the desired code indicia, and erasing means 50 for erasing selected portions of the storage means 44.

The code bank means 40, moreover, includes a code indicia supply 52. The code indicia supply 52 contains a large quantity of code indicia for encoding documents which are issued by the document issuing means 10. The code indicia may be contained recorded on the storage means for subsequent issuance, being generated at one time and in a sufficiently large quantity so that duplication of codes will not occur within a foreseeable time period. Alternatively, a random numbers generator may be used to generate respective code indicia for issuance either in advance or at the time that a request for code indicia is obtained from the document issuing means 10. In any event, the code indicia supply 52 serves as the supply source for the code indicia 26 used for encoding the documents. As shown in FIG. 3, the indicia 24 most suitably are associated with a particular document issuing means, thereby identifying the agent or location issuing the ticket, while the indicia 26 comprise the document serializing indicia which are supplied by the code indicia supply 52.

The present invention will be quite clearly understood by the following description which describes the process for protecting and validating a particular document.

When purchasing a particular document, such as an airline travel ticket, the ticket is filled out in the usual manner and then the ticket 14A is inserted into the encoding means 18 which forms a part of the document issuing means 10. The buffer storage means 20 has previously been filled with a predetermined quantity of code indicia which have been supplied by the code indicia supply means 52 via the code transmittal conductor 60. Typically, the buffer storage means receives one hundred sets of code indicia, numeral 26, FIG. 3, during a single code transmission. The ticket 14A inserted in the encoding means 18 actuates the control means 16 to operate the buffer storage means 20. The buffer storage means 20 supplies the encoding means with the respective set of code indicia which are now used to encode the ticket 14A. The ticket 14A is now encoded as shown in FIGS. 2 and 3. The particular code indicia appearing on the document 14A are stored also in the central code storage 44 by virtue of the following process. Whenever the buffer storage means 20 runs low or runs out of a supply of code indicia, the control means 16 via conductor 62 causes a code request signal to be transmitted to the code bank means 40 and the code bank means 40 responsive to the operation of the control means 42 is actuated to supply code indicia via conductor 60 to the buffer storage means. Simultaneously, the supplied indicia are recorded by the recording means 46 in the central code storage means 44 so that the central code storage means 44, magnetic tape or disk storage, for instance, has recorded all of the code indicia which have been issued to one or more document issuing means 10 for encoding tickets and which are contained in the buffer storage means 20 or which have been withdrawn from the buffer storage means 20 and applied to a respective document, such as document 14A.

When the ticket 14A is presented to the document validation means disposed, for instance, at an airline terminal, the ticket 14A is brought into operative engagement with the code sensing and validation means 34. The control means 32 causes responsive to the sensing of the code indicia 24, 26 a code interrogation signal to be transmitted via conductor 64 to the code bank means 40. The control means 42 causes the search means 48 to be actuated for searching the central code storage 44 for the particular set of code indicia. If the code indicia are not present in the central code storage means 44, a 'reject signal' is provided via conductor 66 to the document validation means for illuminating a respective signal lamp 36 or 38. Alternatively, the ticket may be stamped with a notation indicating its invalid status, or it may be rendered inaccessible for further use. The reject signal indicates that the ticket is either a false or forged document by carrying a wrong code or, alternatively, that it is a duplicate ticket of a previously used and redeemed ticket.

However, if the code indicia as searched by the search means 48 are contained in the central code storage means 44, a 'validation' or 'authentication' signal is transmitted via conductor 66 to the document validation means 30 to signify that the ticket is one which was properly encoded by an authentic document issuing means 10 and that the ticket is not one that has previously been presented for authentication. The 'validation' signal may affix visible markings to the ticket indicative of its authenticated status. Such markings may comprise a stamped marking, perforation, etc. Simultaneously with the generation and transmittal of the validation or authentication signal from the code bank means 40 via conductor 66 to the validation means 34, the erasing means 50 is actuated to cause erasing of the respective code indicia in the central code storage means 44 so that the same ticket or a document carrying the identical code indicia, a forged or a duplicated document, for instance, can not be validated, at least within a predetermined time interval before the same code indicia are repeated.

Figure 4:
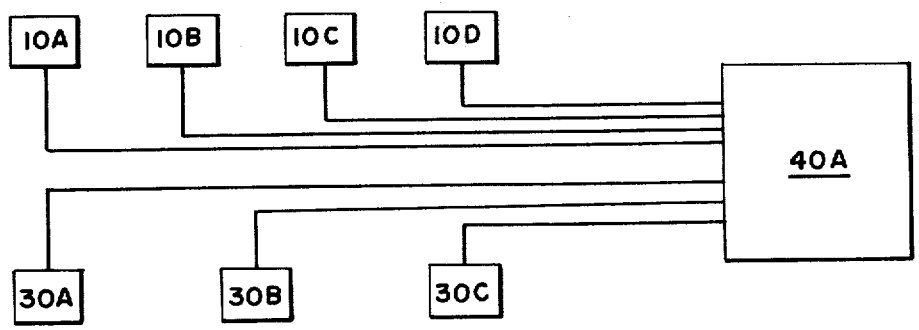
FIG. 4 is a schematic illustration of an arrangement showing a plurality of document issuing means and a plurality of document validation means coupled to a code bank means.

FIG. 4 illustrates an arrangement wherein the code bank means 40A is coupled to a plurality of document issuing means 10A, 10B, 10C, 10D, etc. and to a plurality of document validation means 30A, 30B, 30C, etc. It will be apparent that this arrangement duplicates the individual blocks described hereinabove and that in this latter case, the code bank means 40A, like a central computer, is used to service the plurality of remote input and output stations which may be disposed at different locations.

In an alternative embodiment it will be possible to install in the document issuing means 10 a device as shown in my U.S. Pat. No. 3,501,744, issued Mar. 17, 1970 entitled, "Postage Metering System Having Signal Conditioning Means", for the purpose of controlling the amount of money which a ticket agent is permitted to issue against travel tickets. As shown in this patent supra, a ticket agent may be restricted to issue tickets aggregating to a certain predetermined amount of money which amount is controlled incrementally by a remote station. In this manner, the indiscriminate and possibly fraudulent issuance of travel tickets can be controlled.

In another alternative embodiment the buffer storage means 20 can be controlled as disclosed in my patent supra. Specifically, the buffer storage means may contain a larger supply of indicia for the encoding means, all indicia being recorded in the central code storage means 44. However, by means of a signal from the code bank means 40 to the buffer storage means 20 only a sub-quantity of code indicia is made available for the encoding means 18. Subsequent signals are required for releasing further sub-quantities of code indicia from the buffer storage means. When the buffer storage means is completely exhausted, it is filled up again with a larger quantity, typically a thousand sets of indicia for encoding one thousand tickets, but each sub-quantity may comprise only one hundred sets of indicia.

It shall be understood, further, that instead of automatic code sensing means, manually operated pushbuttons or other input means may be used for producing the code responsive interrogation signal. This arrangement is particularly useful if the code indicia are visible characters or displayed visually. In a similar manner, the well known manually operated pencil type light probe may be used for sensing respective code indicia and providing a signal in response to a manual scan.

In another embodiment, the central code storage means 44 may be associated with a further or secondary code storage means so that indicia removed from the code storage means responsive to the presentation of a valid document are transferred to said further storage means for long-term preservation. Simultaneously, additional data may be recorded, such as the location or redemption, date, and other identifying information pertaining to the person or the document. As a natural extension, information concerning the circumstances surrounding the presentation of a rejected document may be recorded also in the storage means 44.

Moreover, the present arrangement may be used for cancelling validly issued tickets in case of theft being discovered. Such cancellation is accomplished by erasing the respective code indicia, which may be available from purchase records, from the central code storage means.

Further and still other variations of the above invention will be quite apparent to those skilled in the art. However, it should be obvious that the present invention concerns itself primarily with the encoding of a document, storing the encoded code means while the document is unredeemed, and on redeeming the document to ascertain whether or not the encoded data are indicative of a valid document by having been stored previously. Upon redemption of the document the encoded data are erased from respective storage means.

What is claimed is:

1. An arrangement for protecting and authenticating a document comprising:
   a document issuing means which includes means for encoding a document, a buffer storage means adapted to store codes, and control means for causing a document in operative engagement with said encoding means to be encoded with code indicia withdrawn from said buffer storage means;
   a code bank means which includes means for providing code indicia, and central code storage means;
   means for coupling said document issuing means to said code bank means for causing said code indicia supply responsive to a predetermined condition of said buffer storage means to transmit and enter into said buffer storage means a plurality of code indicia for encoding a predetermined quantity of respective documents with individually differing code indicia, and for causing the code indicia transmitted to said buffer storage means to be entered and stored by said central code storage means;
   a document validation means which includes input means for providing a signal responsive to code indicia disposed on a document;
   means coupling said document validation means to said code bank means for providing, responsive to the operation of said input means, to said code bank means an interrogation signal, and responsive to the presence of said code indicia in said central code storage means providing a document validation signal to said document validation means, and
   means for controlling said central code storage means for erasing responsive to the initiation of said validation signal the respective code indicia from said central code storage means.

2. An arrangement for protecting and authenticating a document comprising:
   a document issuing means which includes means for encoding a document, a buffer storage means adapted to store codes, and control means for causing a document in operative engagement with said encoding means to be encoded with code indicia withdrawn from said buffer storage means;
   a code bank means which includes means for providing code indicia, and central code storage means;
   means for coupling said document issuing means to said code bank means for causing said code indicia supply responsive to a predetermined condition of said buffer storage means to transmit and enter into said buffer storage means a plurality of code indicia for encoding a predetermined quantity of respective documents with individually differing code indicia, and for causing the code indicia transmitted to said buffer storage means to be entered and stored by said central code storage means;
   a document validation means which includes a document receiving means, and code indicia sensing means for sensing the encoding applied to a document when such document is in operative engagement with said receiving means;
   means coupling said document validation means to said code bank means for providing, responsive to a document being in operative engagement with said receiving means, to said code bank means an interrogation signal responsive to the sensed code indicia, and responsive to the presence of said code indicia in said central code storage means providing a document validation signal to said document validation means, and
   means for controlling said central code storage means for erasing, responsive to the initiation of said validation signal, the respective code indicia sensed by said sensing means from said central code storage means.

3. An arrangement for protecting and authenticating a document as set forth in claim 2, said code indicia comprising a first portion denoting the issuing agent and a second serializing portion peculiar to the respective document.

4. An arrangement for protecting and authenticating a document as set forth in claim 2, said central code storage means comprising magnetic storage means.

5. An arrangement for protecting and authenticating a document as set forth in claim 2, said validation signal causing actuation of means for affixing markings to the document indicating its authenticated status.

6. An arrangement for protecting and authenticating a document as set forth in claim 2, said buffer storage means adapted to receive and store code indicia for encoding a predetermined quantity of documents.

7. An arrangement for protecting and authenticating a document as set forth in claim 2, said means for providing code indicia including a random numbers generator.

8. An arrangement for protecting and authenticating a document as set forth in claim 2, said code indicia comprising characters.

9. An arrangement for protecting and authenticating a document comprising:
- a document issuing means which includes means for encoding a document, a buffer storage means adapted to store codes, and control means for causing a document in operative engagement with said encoding means to be encoded with code indicia withdrawn from said buffer storage means;
- a code bank means which includes means for providing code indicia, and central code storage means;
- means for coupling said document issuing means to said code bank means for causing said code indicia supply upon a predetermined condition of said buffer storage means to transmit and enter into said buffer storage means a plurality of code indicia for encoding a predetermined quantity of respective documents with individually differing code indicia, and for causing the code indicia transmitted to said buffer storage means to be entered and stored by said central code storage means;
- a document validation means which includes a document receiving means, and code indicia sensing means for sensing the encoding applied to a document when such document is in operative engagement with said receiving means;
- means coupling said document validation means to said code bank means for providing, responsive to a document being in operative engagement with said receiving means, to said code bank means an interrogation signal responsive to the sensed code indicia, and responsive to the presence of said code indicia in said central code storage means providing a document validation signal to said document validation means, and responsive to the absence of said code indicia in said central code storage means providing a document reject signal to said document validation means, and
- means for controlling said central code storage means for erasing, responsive to the initiation of said validation signal, the respective code indicia sensed by said sensing means from said central code storage means.

10. An arrangement for protecting and authenticating a document as set forth in claim 1 and including a register operatively associated with said buffer storage means and adapted to be set to a predetermined incremental value representing a sum of money; said control means for causing said encoding means to be encoded with code indicia including adjustable means for causing said code indicia withdrawn from said buffer storage means be associated also with a monetary value assigned to said document and means coupled for effecting such monetary value to be reflected in said register to cause said register to exhibit responsive to the encoding of a respective document a reduced sum of money, and means coupled to said document issuing means for inhibiting operation of said encoding means responsive to said control means being set for providing encoding in an amount which exceeds the balance of money remaining in said register.

* * * * *